Aug. 29, 1933.  J. L. DRAKE  1,924,597
GLASS SURFACING TOOL
Filed Feb. 14, 1929
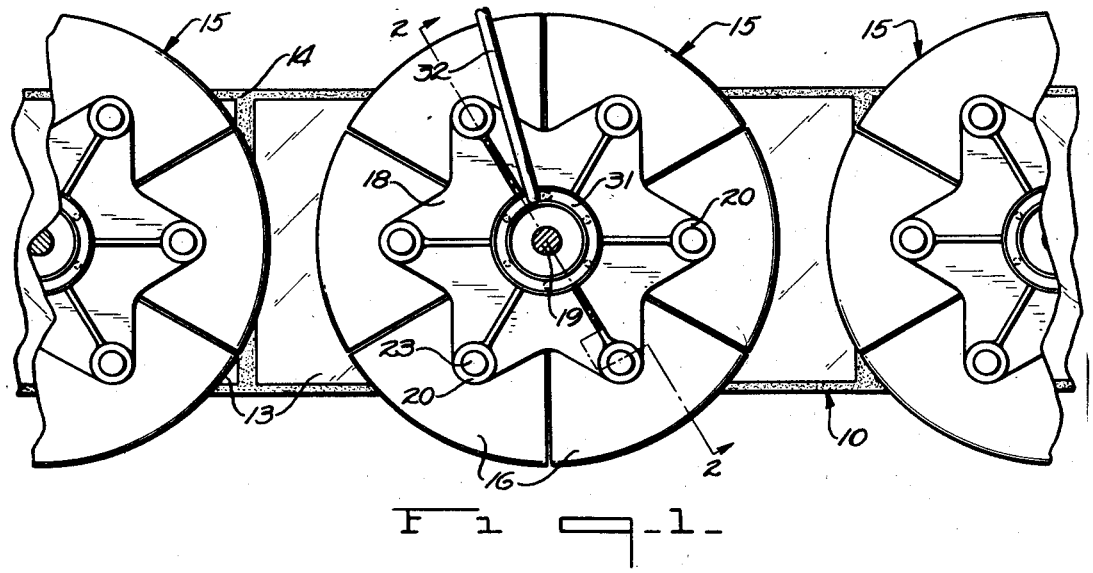
Fig. 1.
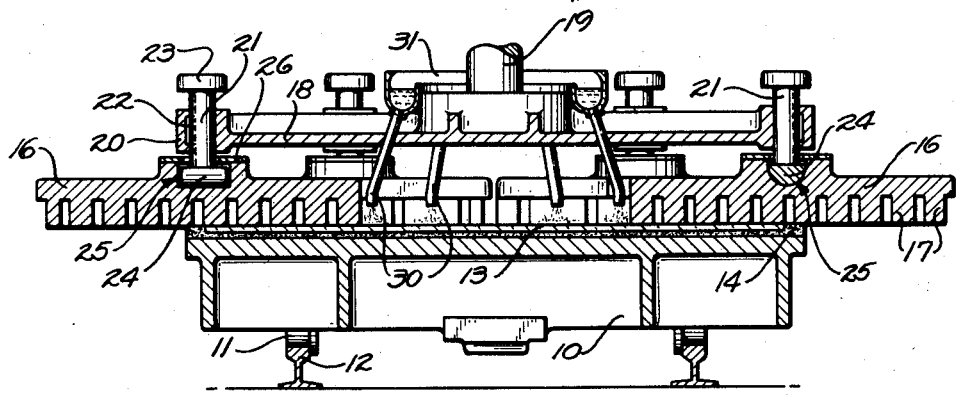
Fig. 2.
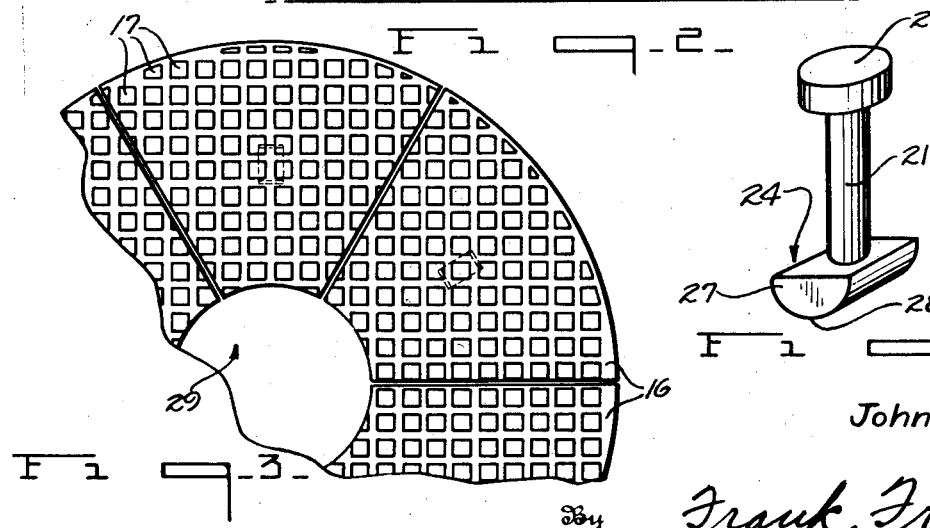
Fig. 3.
Fig. 4.
Inventor
John L. Drake
By Frank Fraser
Attorney Patented Aug. 29, 1933

1,924,597

UNITED STATES PATENT OFFICE 1,924,597

GLASS SURFACING TOOL

John L. Drake, Toledo, Ohio, assignor to Libbey-Owens-Ford Glass Company, Toledo, Ohio, a corporation of Ohio Application February 14, 1929. Serial No. 339,825

3 Claims. (Cl. 51—209)

This invention relates broadly to apparatus for surfacing sheet glass and has for its primary object the provision of an improved form of grinding head or tool.

The grinding tool herein provided is particularly well adapted for use in the continuous system for surfacing sheet glass, wherein a plurality of tables or other carriers are arranged to carry a plurality of glass sheets, mounted thereupon, first beneath a series of grinding units and then beneath a series of polishing units. The invention is, however, not restricted to use in such connection.

In the continuous system referred to above, the grinding tools employed are usually of annular or disc formation, these tools being quite large and exceedingly heavy since they are ordinarily constructed of cast iron or some other metal. As the glass sheets are carried along and subjected to the action of the grinding tools, the said sheets sometimes become cracked or broken and this is believed to be due to unevenness of the glass sheet or some unevenness on the glass surface such as when the abrasive material becomes caked thereon. That is, as the glass sheet is carried along, the uneven or thicker portion of the sheet passing beneath the grinding tool tends to effect a raising or lifting thereof. When this occurs, the entire weight of the tool naturally rests upon the sheet at this particular point and the pressure exerted thereby is very apt to cause a fracture or breaking of the sheet.

The principal aim, therefore, of the present invention is to entirely eliminate or reduce to a minimum breakage of the glass sheets from this cause. This is herein accomplished by constructing the grinding head or tool of a plurality of independent sections or segments associated with one another to form a tool of substantially annular or disc formation, each section being provided with a separate mounting whereby it may be moved vertically independently of the remaining sections, the separate mounting also allowing independent rocking movement of each section with respect to the remaining sections while, at the same time, preventing rotation thereof. As a result, when an uneven portion of the sheet passes beneath the grinding tool, only that particular section of the tool with which the thicker or raised portion of the sheet comes in contact will be lifted and thus only a fraction of the entire weight of the tool will rest upon this portion of the sheet. The weight of only a single grinding section is not adapted to be such as to exert sufficient pressure upon the glass to cause a breakage or fracture thereof.

Other objects and advantages of the invention will become more apparent during the course of the following description when taken in connection with the accompanying drawing.

In the drawing forming a part of this application and wherein like numerals are employed to designate like parts throughout the same, Fig. 1 is a plan view showing a plurality of grinding tools provided by the present invention in association with the continuous system for surfacing sheet glass.

Fig. 2 is a section taken substantially on line 2—2 of Fig. 1.

Fig. 3 is a bottom view of a portion of the grinding tool, the recesses in the upper surfaces of the individual grinding sections being indicated in broken lines; and Fig. 4 is a detail perspective view of a portion of the mounting for each grinding section.

Referring to the drawing and particularly to Fig. 2, the numeral 10 designates a glass supporting table carried by wheels 11 running upon tracks 12. The glass sheet or plate 13 to be surfaced is adapted to be secured upon the table preferably by embedding the same in a layer of plaster of Paris or the like 14 or in any other suitable manner. As shown in Fig. 1, a plurality of tables 10 are preferably arranged end to end in a continuous line and have secured upon the upper surfaces thereof a plurality of glass sheets 13. The tables may be propelled along tracks 12 by any suitable means so as to carry the glass sheets in a definite, substantially horizontal path first beneath a series of grinding units and then beneath a series of polishing units. After the upper surfaces of the sheets have been ground and polished, the sheets are removed from the tables, turned over, again secured to the tables and passed beneath the grinding and polishing units to surface the second side. Since this invention in no way concerns the polishing operation, no polishing units have been illustrated. The grinding tools herein provided are, however, of a novel construction whereby to effect the accomplishment of those objects and advantages enumerated hereinabove.

The improved grinding head or tool provided by the present invention is designated in its entirety by the numeral 15 and consists of a plurality of independent sections or substantially triangular shaped segments 16, each provided upon the undersurface thereof with a plurality of spaced grinding projections or lugs 17. The individual sections or segments 16 are so shaped and associated with one another as to form a grinding head or tool of substantially annular or disc formation. This shape of tool is desirable as it has been found that the most satisfactory grinding action may be obtained therewith. The several sections 16 are carried by a common horizontal supporting or runner frame 18 secured at the lower end of the vertical drive spindle 19 of the grinding unit.

The horizontal supporting frame 18 is provided with a plurality of spaced vertical bearing portions 20, one being provided for each grinding section 16. Projecting vertically through each bearing portion 20 is a stub shaft 21 slidably keyed therein by means of a key 22 and having at its upper end a head or the like 23 to limit downward movement of said stub shaft and prevent displacement thereof from its bearing 20. Each stub shaft 21 is provided at its lower end with an elongated foot 24 received within an elongated opening or recess 25 in the respective grinding section 16 and secured therein by a cover plate or the like 26. The elongated recesses 25 preferably extend radially of the surfacing tool or longitudinally of the respective grinding sections.

Upon reference to Fig. 4, it will be noted that the elongated foot 24 is cut off square at its opposite ends as indicated at 27 while the bottom 28 thereof is transversely curved or rounded. The recess 25 in section 16 is of a width to snugly receive the foot therein and the bottom is shaped transversely to correspond to the shape of the foot as shown at the right in Fig. 2. However, the recess 25 is also square at its opposite ends and is somewhat longer than the foot to provide a desired amount of clearance at the opposite ends thereof as best shown at the left in Fig. 2. Also, the plate 26 is spaced slightly above the foot to provide a like clearance at the top thereof. Thus, it will be apparent that by the construction disclosed, the grinding sections 16 will be permitted to rock relative to one another both transversely or circumferentially of the tool and also longitudinally or radially thereof. In addition, each section will be allowed a limited amount of free vertical bodily movement but will be prevented from rotating. By holding the sections against rotation, the said sections will be maintained in proper position with respect to one another and will be held from hitting or binding against one another and which might act to retard free rocking and vertical movement thereof.

The sections 16 are shaped and associated or interfitted with one another in such a manner as to form a grinding tool of disc formation having an opening 29 at the center thereof. Ordinarily, the desired grinding effect is obtained by the combined action of the grinding tool and an abrasive material supplied upon the upper surfaces of the glass sheets. The abrasive material is herein adapted to be supplied upon the sheet through the opening 29 by means of a plurality of depending conduits 30 leading from the abrasive supply trough 31 carried by supporting frame 18. The abrasive material may be supplied to the trough from a supply pipe or the like 32.

By constructing the grinding tool in the manner above described, each grinding section 16 is capable of both vertical and rocking movement independently of the other sections. Thus, should the glass sheets being carried beneath the grinding tools be of un-uniform thickness or should any abrasive material become caked thereon, this thicker or raised portion of the sheet engaging the surfacing tool will tend to rock or lift only that grinding section 16 with which it comes in contact. As a result, the glass will be subjected to the pressure exerted by the single raised section and will at no time be subjected to the entire weight of the grinding head. While the entire weight of the grinding head upon one portion of the sheet may be sufficient to crack or break the same, a single section will not exert sufficient pressure to cause such breaking. Consequently, breakage of the sheet should be reduced to a minimum, if not entirely eliminated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A glass grinding head comprising a runner frame, a plurality of substantially triangularly shaped segments interfitted with one another in a manner to provide a tool of disc formation, vertical shafts carried by said frame, one being provided for each segment, means for mounting the shafts for slidable but non-rotatable movement and connections between each shaft and its respective segment to allow both vertical and rocking movement thereof while preventing its individual rotation.

2. A glass grinding head comprising a runner frame, a plurality of substantially triangularly shaped segments interfitted with one another in a manner to provide a tool of disc formation, a plurality of bearing portions in said runner frame, shafts mounted for vertically slidable but non-rotatable movement within said bearing portions, one being provided for each segment, each shaft having an enlarged portion at its lower end freely received within a recess in the corresponding segment, said enlarged portion and recess being so shaped as to prevent individual rotation of the segment while allowing both vertical and rocking movement thereof.

3. A glass grinding head comprising a runner frame, a plurality of substantially triangularly shaped segments interfitted with one another in a manner to provide a tool of disc formation, a plurality of bearing portions in said runner frame, shafts mounted for vertically slidable but non-rotatable movement within said bearing portions, one being provided for each segment, each shaft being provided at its lower end with a horizontally elongated foot rigidly connected thereto, the bottom surface of which is rounded, said foot extending radially of the tool and being received within a recess in the corresponding segment shaped to conform to the shape thereof whereby to prevent individual rotation of the segment while allowing both vertical and rocking movement thereof.

JOHN L. DRAKE.